United States Patent Office 2,832,746
Patented Apr. 29, 1958

2,832,746

WATER-INSOLUBLE HOMOGENEOUS POLYMER BLENDS OF A WATER-INSOLUBLE, WATER-DISPERSIBLE, NONELECTROLYTE FILM-FORMING POLYMER WITH WATER-SOLUBLE LINEAR ORGANIC POLYMERS UNITED BY IONIC CROSSLINKAGES, AND THEIR PREPARATION, AND FABRICS COATED THEREWITH

Harold L. Jackson, Wilmington, Del., assignor to E. I. du Pont de Nemours and Company, Wilmington, Del., a corporation of Delaware No Drawing. Application February 18, 1953
Serial No. 337,671

21 Claims. (Cl. 260—45.5)

This invention relates to new polymeric compositions and to their preparation. More particularly, this invention relates to new polymer blends comprising crosslinked polymers of a special type and to methods for their preparation.

The terms "crosslinked polymers" and "crosslinking" are used in their usual and accepted meaning in polymer chemistry (see, for example, Ellis, "The Chemistry of Synthetic Resins," Reinhold Publishing Corp., 1935, at pages 59–62; Gilman, "Organic Chemistry," John Wiley and Sons, 1943, vol. I, chapter on Synthetic Polymers by Marvel and Horning, particularly at pages 703, 719, 720, and 750; Schildknecht, "Vinyl and Related Polymers," John Wiley and Sons, 1952, particularly at pages 68–81 and 208–211). Likewise, the terms "ionic linkage" and "covalent linkage" have their usual meaning (see, for instance, in Gilman's "Organic Chemistry," already referred to, vol. II, the chapter on Modern Electronic Concepts of Valence by J. R. Johnson, particularly at pages 1825–1827).

Polymers crosslinked through ionic linkages have been described in an article by Fuoss and Sadek, Sci. 110, 552 (1949). They are obtained by reacting polymeric polyanions, such as polyacrylic acid (as the sodium salt), with polymeric polycations such as polymeric polyquaternary ammonium salts.

The space-network of these ionically crosslinked polymers thus consists of polymer chains of oppositely charged polyelectrolytes, which are bound together by ionic crosslinkages formed through the interaction of the cationic groups of one polyelectrolyte species with the anionic groups of the other polyelectrolyte species. Such a structure may be depicted by the following formula, in which the linear polymer chains are represented by the horizontal lines and the ionic groups are, for purposes of illustration, carboxyl groups and quaternary ammonium groups:

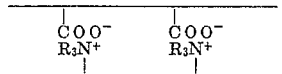

It will be apparent that these products differ structurally from the known polymers obtained by copolymerization of vinyl monomers containing anionic and cationic groups, respectively, e. g., the copolymers of methacrylic acid and vinylpyridine. In these copolymers the ionic linkages are within the same polymer chain rather than across two chains. These structural differences are reflected in the fact that these copolymers are soluble in both dilute acid and dilute alkali, whereas the ionically crosslinked polymers used in this invention are water-insoluble over the entire pH range, i. e., insoluble in either dilute acid or dilute alkali.

Ionically crosslinked polymers are film-forming, and the films have the advantageous property of being highly permeable to moisture. However, they suffer from the disadvantages of low wet strength, poor dimensional stability and brittleness at low relative humidity.

It is an object of this invention to provide new polymer blends comprising crosslinked polymers of a special type and methods for their preparation. A further object is to provide new polymer blends comprising crosslinked polymers which have a high degree of moisture permeability and are also dimensionally stable and remain tough and pliable at low relative humidity. A still further object is to provide new polymer blends which are film-forming materials and possess the desirable properties of moisture permeability, dimensional stability, toughness and pliability at low relative humidity. Other objects will appear hereinafter.

These objects are accomplished by the following invention of polymer blends comprising at least two oppositely charged ionic polyelectrolyte polymers united through a plurality of ionic crosslinkages and at least 10%, by weight of the blend, of a water-insoluble, water-dispersible, nonelectrolyte, film-forming polymer. Thus these polymer blends comprise (a) at least one polyanionic polyelectrolyte polymer and at least one polycationic polyelectrolyte polymer, which polymers are united through a plurality of ionic crosslinkages and (b) at least 10%, by weight of the blend, of a water-insoluble, water-dispersible, nonelectrolyte, film-forming polymer. The polymer blends of this invention are film-forming materials which retain the moisture permeability of ionically crosslinked polymers but are dimensionally stable and remain tough and pliable at low relative humidity.

The novel polymeric blends of this invention are prepared by mixing an aqueous dispersion of a water-insoluble, water-dispersible, nonelectrolyte, film-forming polymer with an aqueous solution of at least one polyelectrolyte polymer having a plurality of ionic charges of the same sign as that of the surface charge of the particles of the dispersed nonelectrolyte polymer, and adding to this mixture an aqueous solution of at least one polyelectrolyte polymer having a plurality of ionic charges of the opposite sign, thereby ionically crosslinking the polyelectrolyte polymers and coprecipitating therewith the nonelectrolyte polymer as a water-insoluble, homogeneous polymer blend. It is preferable to employ in the process of this invention a substantially chemically equivalent amount of the oppositely charged polymeric polyelectroltyles.

The polyelectrolyte polymers employed in the preparation of these compositions are linear polymers which contain as integral components of the polymers themselves a plurality of ionically charged units attached to the linear polymer chain. Many such polymers, both of the cationic and anionic type, have been described in the literature. The polyelectrolytic polymers should be soluble in water to an appreciable extent, for example, to the extent of at least 1%. Each polyelectrolyte polymer molecule should contain at least seven ionically charged units, since in general at least this number is required to obtain a final polymer of satisfactory properties.

In general, the ionic crosslinkages are formed by reacting the polycationic polyelectrolyte polymer and the polyanionic polyelectrolyte polymer in substantially chemically equivalent quantities, i. e., in such quantities that there is present about one anionic group for each cationic group. However, some departure from these quantities can be tolerated, for example, there can be used a moderate molar excess, up to 50%, of one or the other polyelectrolyte polymer. The reaction takes place readily at ambient temperature, but if desired elevated temperatures up to about 100° C. can be used, the preferred temperature range being between 10 and 50° C.

When, as is often the case, the polyanionic polyelectrolyte polymer is a salt of a polybasic polymeric acid and the polycationic polyelectrolyte polymer is a salt of a polymeric base, there is also formed by metathesis a simple organic or inorganic salt which is normally soluble in water and can be readily separated from the ionically crosslinked polymer. The ion-crosslinking reaction can be illustrated as follows, using as example a salt of a polymeric polycarboxylic acid, the symbol M representing the cation of this salt, and a polymeric polyquaternary ammonium halide, the symbol Hal representing the halogen, and the horizontal lines representing the linear polymeric chains:

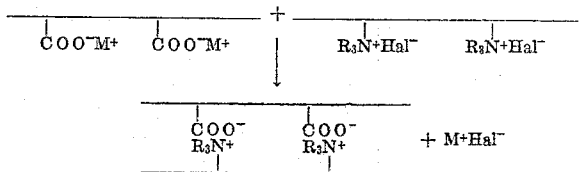

The reaction product, which is an ionically crosslinked polymer, is insoluble in water and separates from the aqueous reaction medium. Moreover, as already stated, it is also insoluble in dilute aqueous acid and dilute aqueous alkali, i. e., over the entire pH range.

At the same time as the ionic crosslinking reaction takes place between the two oppositely charged polyelectrolyte polymers, the nonelectrolyte polymer present in the reaction system is flocculated from its aqueous dispersion. The principal reason for this fact is that the surface charge of the dispersed polymer particles is neutralized or diminished by the introduction into the system of the polyelectrolyte of opposite charge, although it is also possible that other colloidal phenomena play a part.

It is well known that the particles of an aqueous polymer dispersion have a superficial electrostatic charge, which is particularly appreciable when the dispersion was prepared with the help of an ionogenic (cationic or anionic) surface-active agent (see, for example, the discussion at pages 121–124 of "Surface Activity," by Moilliet and Collie, E. and F. N. Spon, Ltd., London, 1951). Thus, the particles in the aqueous dispersions of nonelectrolyte polymers used in the process of this invention have a surface charge which is positive or negative, depending in part on whether or not the dispersing agent used was cationic or anionic. The sign of the surface charge, if it is not known, can be determined readily by mixing a small sample of the dispersion with a polyelectrolyte of known sign, for example, a polyanion. If precipitation takes place, the nonelectrolyte polymer particles in the dispersion may be assumed to have carried a surface charge of the opposite sign, in this case, positive, whereas in the absence of precipitation the surface charge is considered negative.

For the reason just discussed, it is important in the process of this invention to mix the aqueous dispersion of nonelectrolyte polymer with the solution of that polyelectrolyte which has the same sign as the surface charge of the particles. When this mixture is next treated with the solution of the other polyelectrolyte, the stability of the polymer dispersion is destroyed and the nonelectrolyte polymer precipitates with the ionically crosslinked polymer. It has been observed that this precipitation of the nonelectrolyte polymer is generally quantitative, and because of this fact it is possible to predict accurately what the composition of the final polymer will be. The coprecipitate is a homogeneous blend. This polymeric blend retains the moisture permeability of the unmodified ionically crosslinked polymer, but has acquired the additional advantageous properties of toughness, pliability and dimensional stability.

This invention is illustrated in greater detail, but not limited, by the following examples.

*Example I*

To 25 ml. of a latex (25% solids content) of an ethylene/vinyl acetate copolymer (3.5/1 molar ratio) was added 20 ml. of an aqueous solution containing 0.6 milliequivalent/ml. of sodium polyacrylate. After thorough stirring, there was added to this mixture 70 ml. of an aqueous solution containing 0.2 milliequivalent per milliliter of poly-beta-methacrylyloxyethyltrimethylammonium methylsulfate (the polymeric methosulfate of beta-dimethylaminoethyl methacrylate

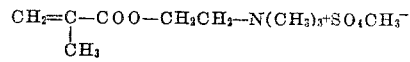

see U. S. Patent 2,138,763). A polymeric product separated, leaving a clear supernatant liquid. This material, which was a homogeneous blend of the ethylene/vinyl acetate copolymer with the ionically crosslinked polyelectrolyte and contained 32% by weight of the latter, was washed thoroughly with water while being kneaded by hand to remove the sodium methylsulfate.

One portion of this product was pressed at room temperature to a thin film which was quite pliable and tough when air-dried. This film retained its high degree of pliability even when dried in a vacuum oven at 90° C.

The second portion of the polymeric product was kneaded with glycerol and then pressed at room temperature to a film of 9 mil thickness. This film had the same properties as the one described above. It possessed good permeability to water vapor, as indicated by a leather permeability value of 4000.

In contrast, a film prepared from the same ion-crosslinked polyelectrolyte alone became very brittle when dried and a film of the unmodified ethylene/vinyl acetate copolymer alone was tacky and weak both before and after oven drying.

In this and other examples, the leather permeability data are in units of grams of water per 100 square meters per hour. They were obtained in tests carried out according to a modification of the method of Kanagy and Vickers (Journal of American Leather Chemical Association 45, 211–242, April 1950). In the modification of this test used here, an approximately 3-inch diameter crystallizing dish is filled with 12-mesh calcium chloride and covered (using tight, non-permeable seals at the edges) with a sample of the film under test, and then suspended inverted in an atmosphere of high humidity (90% relative humidity at 23° C.). The equilibrium rate of water absorption by the calcium chloride is obtained by weighing the assembly at suitable intervals, and the results are noted in the units given above. In general, under these conditions, shoe-upper leathers exhibit leather permeability values within the range 2000–18,000 gms./100 m.²/hr.

*Example II*

To 25 ml. of a polychloroprene latex containing 35% solids and prepared by polymerizing chloroprene in an aqueous system in the presence of an anionic dispersing agent, sodium rosinate, was added 25 ml. of distilled water and 20 ml. of an aqueous solution of sodium polyacrylate (0.6 milliequivalent/ml.). The resulting dispersion was then stirred while 65 ml. of an aqueous solution of poly-beta-methacrylyloxyethyltrimethylammonium methylsulfate (0.2 milliequivalent/ml.) was added. The stirring was continued for 5 minutes and the mass which separated was then washed thoroughly with water.

The polymeric blend, which contained 25% by weight of the ion-crosslinked polyelectrolyte, was pressed at room temperature to a film 9 mils in thickness. This film had a leather permeability value of 5900. It was pliable, tough and clear at a relative humidity of 29%, and retained its pliability even after being kept overnight over a drying agent at reduced pressure.

In another experiment, two curing agents (a poly-p-dinitrosobenzene rubber accelerator activator and a sodium dibutyl dithiocarbamate rubber accelerator) were milled into this polymeric blend while it was still moist and then the milled polymer was pressed while still moist at room temperature into thin films. After air-drying, these films were cured at 140° C. for 30 minutes to form tough, elastic films. When stretched, small strips of these films were noted to undergo a "necking down" which indicated the presence of cold-drawing properties.

Another portion of the polymeric blend of neoprene and an ion-crosslinked polyelectrolyte prepared as described above was pressed onto cotton sateen at room temperature. The resulting coated fabric exhibited good pliability and the polymer was well anchored to the fabric.

*Example III*

To 25 ml. of a polychloroprene latex containing 50% solids and prepared by polymerizing chloroprene in an aqueous dispersion in the presence of an anionic dispersing agent, sodium rosinate, was added 25 ml. of an aqueous solution of sodium polyacrylate (0.6 milliequivalent/ml.). To this well stirred mixture was added 85 ml. of an aqueous solution of poly-beta-methacrylyloxyethyltrimethylammonium methylsulfate (0.2 milliequivalent/ml.). The polymeric blend which precipitated was removed from the clear, supernatant liquid and washed well with water. It contained 27% by weight of ion-crosslinked polyelectrolyte.

While still moist, the polymeric blend was placed on a rubber mill. While on the rubber mill, 0.6 g. of zinc oxide, 0.25 g. of micronized sulfur, 0.5 g. of a 33% dispersion of thiocarbanilide, and 0.2 g. of dispersed carbon black were incorporated. The milled product was then immediately pressed at room temperature onto cotton sateen to form a thin fabric coating. After air-drying, this product was pressed at 100° C. for 20 minutes under a platen having a leather-like grain. The resulting embossed coated fabric was quite pliable and tough. It exhibited a leather permeability value of 2700 at 21.4 mils thickness. This product had a Schiltknecht flex-life of 2 million.

The Schiltknecht flex-life values refer to the number of flexes the films undergo when flexed at 23° C. and 50% relative humidity in the Schiltknecht flex machine (Bulletin No. 105 of Alfred Suter Co., 200 Fifth Avenue, New York, N. Y.). These values represent a measure of the toughness of the material under constant flex, and as regards resistance to flexing they represent an accelerated wear test. The higher the value reported in this test, the more resistant is the material to failure caused by flexing.

*Example IV*

To 40 ml. of an aqueous dispersion, containing 20% solids, of N-methoxymethyl polyhexamethyleneadipamide (U. S. Patent 2,430,860) was added 20 ml. of aqueous sodium polyacrylate solution (0.55 milliequivalent/ml.) and 35 ml. of a 10% aqueous solution of poly-beta-methacrylyloxyethyldiethylmethylammonium methylsulfate (0.32 milliequivalent/ml.). A white gel-like mass separated.

This mass was air-dried to a product having a horny-like composition. This product was then pressed at 130° C. to form a film 11 mils in thickness. The resulting film was opaque, tough, and somewhat elastic. It contained 31% ion-crosslinked polyelectrolyte and had a leather permeability value of 3400.

*Example V*

To 25 ml. of a latex (38.2% solids) of a 1,3-butadiene/acrylonitrile copolymer containing 15% by weight of polymerized acrylonitrile was added 20 ml. of aqueous sodium polyacrylate solution (0.6 milliequivalent/ml.). To this was added 70 ml. of an aqueous solution of poly-beta-methacrylyloxyethyltrimethylammonium methylsulfate (0.2 milliequivalent/ml.). The polymer blend which separated was washed with water. It contained 23% of the ion-crosslinked polyelectrolyte.

One portion of the polymer blend was pressed at room temperature to a thin film which was pliable even when dried in a desiccator containing a dehydrating agent.

Another portion of the polymeric blend was placed on a rubber mill while still moist and 0.5 g. of zinc oxide, 0.13 g. of micronized sulfur, 0.5 g. of dibutylphthalate, 0.1 g. of stearic acid, and 0.1 g. of powdered tetramethylthiuram monosulfide was incorporated. The milled polymer blend was immediately pressed at room temperature into thin films. After air-drying, these films were cured by heat treatment in the press at temperatures of 100–150° C. The resulting cured films were fairly strong and somewhat elastic.

*Example VI*

A polymeric blend was prepared in the manner described in the above examples from 25 ml. of a latex (55% solids) of dioctyl phthalate-plasticized polyvinyl chloride with an anionic dispersing agent, 20 ml. of aqueous sodium polyacrylate solution (0.55 milliequivalent/ml.) and 55 ml. of an aqueous solution of poly-beta-methacrylyloxyethyltrimethylammonium methylsulfate (0.2 milliequivalent/ml.). After thorough washing, the polymeric blend, which contained 20% by weight of ion-crosslinked polyelectrolyte, was pressed at room temperature to form films 10–15 mils in thickness.

One of the air-dried films was placed on cotton sateen and pressed at 120° C. for 20 minutes to form a coated fabric having good polymer anchorage and good flexibility. This product had a leather permeability value of 3000.

A second film was heated at 120° C. for 20 minutes in a press after being air-dried. It formed a clear, colorless, tough, pliable film which had a leather permeability value of 3500.

*Example VII*

To 5 ml. of the polyvinyl chloride latex of Example VI was added 20 ml. of distilled water and 20 ml. of an aqueous solution of sodium polyacrylate (0.55 milliequivalent/ml.). The mixture was well stirred and then 35 ml. of a 10% aqueous solution of poly-beta-methacrylyloxyethyldiethylmethylammonium methylsulfate was added. The polymeric blend which separated was removed from the clear, supernatant liquid and washed well with water. It contained 57% of the ion-crosslinked polyelectrolyte.

The polymer blend was pressed at room temperature to films. After air-drying, these films were clear and colorless. One of these films was repressed at 120° C. for 20 minutes to form a clear film 8 mil thick which was very pliable at a relative humidity of 53%. This 8-mil film had a leather permeability value of 7000.

*Example VIII*

To 25 ml. of an anionic aqueous dispersion (40% solids) of a methyl acrylate polymer was added 25 ml. of distilled water and 21 ml. of an aqueous solution of sodium polyacrylate (0.55 milliequivalent/ml.). To this mixture was then added with stirring 55 ml. of an aqueous solution of poly-beta-methacrylyloxyethyltrimethylammonium methylsulfate (0.2 milliequivalent/ml.). The polymeric blend which separated contained 27% of the ion-crosslinked polyelectrolyte.

This polymeric blend was washed with water and then pressed at room temperature to films 15 mils in thickness. One of these films was repressed at 100° C. for 15 minutes to form a continuous clear film.

*Example IX*

To 25 ml. of a cationic polychloroprene latex (50.3% total solids) in which benzyl trimethylammonium chloride was employed as the emulsifying agent was added 25 ml. of distilled water and 35 ml. of a 10% aqueous solution of poly-beta-methacrylyloxyethyldiethylmethylammonium methylsulfate. The resulting latex was then stirred with 25 ml. of an aqueous solution of sodium polyacrylate (0.5 milliequivalent/ml.). The polymeric blend which separated was removed from the clear, supernatant liquid and washed well with water. It contained 20% by weight of the ion-crosslinked polyelectrolyte.

This polymeric blend was pressed to 15 mil films at room temperature while still moist. After air-drying, the resulting films were tough, rubbery, and moisture sensitive.

*Example X*

This example illustrates the use of an ion-crosslinked polymer formed from one polycation polyelectrolyte and two different polyanion polyelectrolytes in forming a polymeric blend with a nonelectrolyte polymer.

Thirty milliliters of an anionic (sodium rosinate) polychloroprene latex (33% solids) was mixed with 20 ml. of distilled water, 5 ml. of an aqueous solution of sodium polystyrene sulfonate (17% aqueous solution), and 15 ml. of sodium polyacrylate aqueous solution (0.5 milliequivalent/ml.). The resulting dispersion was then stirred with 40 ml. of 10% aqueous solution of poly-beta-methacrylyloxyethyldiethylmethylammonium methylsulfate. The polymeric blend which separated was removed from the clear, aqueous supernatant liquid and was then washed well with water. It contained 23% of the ion-crosslinked polyelectrolyte.

While still moist, this polymeric blend was pressed at room temperature to 15 mil films. After air-drying, these films were tough and rubber-like.

*Example XI*

This example illustrates the use of an ion-crosslinked polymer formed from one polyanion polyelectrolyte and two different polycation polyelectrolytes in forming a polymeric blend with a nonelectrolyte polymer.

To 20 ml. of anionic latex (45% solids) of a 1,3-butadiene/styrene copolymer (1:1 molar ratio) was added 20 ml. of distilled water and 20 ml. of an aqueous solution of sodium polyacrylate (0.5 milliequivalent/ml.). To this mixture was added with stirring 30 ml. of aqueous poly-beta-methacrylyloxyethyltrimethylammonium methylsulfate (0.2 milliequivalent/ml.) and 30 ml. of poly-4-vinyl-n-butylpyridinium bromide aqueous solution (0.2 milliequivalent/ml.). The polymeric blend which separated was freed from the clear, supernatant liquid and washed well with water. It contained 23% by weight of ion-crosslinked polyelectrolyte.

After pressing this polymeric blend while moist to 15 mil films, the resulting films were air-dried and then repressed at 120° C. for 15 minutes to form clear, tough, elastic films. These products showed a high degree of moisture permeability.

*Example XII*

To 20 ml. of the polyvinyl chloride latex of Example VI was added 20 ml. of distilled water and 20 ml. of an aqueous solution containing 0.5 milliequivalent/ml. of sodium polyacrylate. The mixture was then treated with 30 ml. of a 15% aqueous solution of the acetic acid salt of polydimethylaminoethyl methacrylate. The polymeric blend which separated was removed from the clear supernatant liquid and washed with water. It contained 25% of ion-crosslinked polyelectrolyte.

The moist polymeric blend was pressed to films 15 mils in thickness. These films were repressed after air-drying at 130° C. for 15 minutes to give clear, flexible films which were resistant to water.

*Example XIII*

Twenty milliliters of a cationic polychloroprene latex (50.3% solids) prepared in the presence of benzyltrimethylammonium chloride was diluted with 20 ml. of distilled water and then mixed with 20 ml. of a 10% aqueous solution of a 10/90 copolymer of methacrylamide/beta-methacrylyloxyethyltrimethylammonium methylsulfate. The resulting dispersion was then mixed with 35 ml. of a 5% aqueous solution of the sodium salt of a 1:1 copolymer of methacrylic acid with methyl methacrylate.

The polymeric blend which separated slowly was washed with water and could be pressed while moist into various shapes. It contained 15% of the ion-crosslinked polyelectrolyte.

This and the following example illustrate the preparation of leather-like fabrics by impregnation of a nonwoven web of synthetic fibers with a polymeric blend prepared according to this invention.

*Example XIV*

Twenty grams of a 5.6% aqueous solution of sodium polyacrylate, made by neutralizing 10% aqueous polyacrylic acid with 1 N sodium hydroxide, was mixed with 30 g. of a latex (55% solids) of dioctyl phthalate-plasticized polyvinyl chloride, whereupon the mixture thickened. To the mixture was then added 100 g. of a 2.84% aqueous solution of poly-beta-methacrylyloxyethyltrimethylammonium methylsulfate, whereupon some coagulation took place. The coagulation increased upon rapid stirring of the mixture, with most of the coagulum entrapped in the foam. Approximately 150 g. of ethyl alcohol were added to the mixture with stirring, which coagulated the water-alcohol insoluble ingredients. The reaction mixture was filtered and the solid polymer blend separated by filtration was washed with water, then cold pressed into a smooth film approximately 10 mils thick and containing about 11% by weight of ion-crosslinked polyelectrolyte.

This film was pressed onto the surface of a non-woven fabric of the type described in Example VI of copending application Ser. No. 232,245, filed June 18, 1951, by J. A. Piccard, now U. S. Patent No. 2,676,128, dated April 20, 1954. This fabric was made up of non-woven mats, each consisting of 3 parts of relatively non-fusible fibers of a polyester of ethylene glycol and terephthalic acid and 1 part of relatively fusible fibers of a copolyester of ethylene glycol and a mixture of sebacic acid and terephthalic acid. The non-woven fabrics consisted of nine separate webs arranged in cross-lapped relation, which were compacted by passing between pressure rolls. The compacted fabric weighed approximately 8 ounces per square yard.

The film of the polymeric blend was cold pressed onto this non-woven fabric and then dried at 99° C. for 15 minutes, followed by heating at 149° C. for 30 seconds with slight pressure. The resulting laminated fabric had a leather-like texture and showed good permeability to water vapor, and impermeability to liquid water.

*Example XV*

The preceding example was repeated except that the non-woven web was not pressed prior to lamination with the polymer film, i. e., it had a loose texture, and its thickness was 20 mils. The resulting laminated fabric had properties similar to that of Example XIV.

*Example XVI*

In some cases it is advantageous to employ polymer blends in which the ionically crosslinked polyelectrolyte is also covalently crosslinked. Blends of this type have outstanding film strength. One convenient way of introducing covalent crosslinkages consists in using a polyelectrolyte which contains functional groups capable of crosslinking on heat treatment. Such functional groups may be, for example, 1,2-epoxy groups, which open and crosslink easily, with themselves or with carboxy groups or amino groups, on moderate heating. This examples describes such a blend, comprising a nonelectrolyte polymer and an ionically and covalently crosslinked polyelectrolyte.

One hundred milliliters of 10% aqueous polyacrylic acid was titrated with 110 ml. 1.0 N sodium hydroxide solution to a pH of 7.1. To the resulting solution was added 2.5 g. of epichlorohydrin and the mixture was stirred at room temperature for 5 hours, at which time the pH had increased to 7.4. This treatment served to introduce in the polymer a number of carboglycidyloxy groups

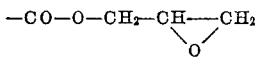

for the purpose of subsequently creating covalent crosslinkages.

To 25 ml. of a polychloroprene aqueous dispersion containing 50.2% solids and prepared by polymerizing chloroprene in an aqueous system in the presence of an anionic dispersing agent, sodium rosinate, was added with stirring 30 ml. of the glycidyl-modified sodium polyacrylate prepared as described above. To this mixture was then added 65 ml. of an aqueous solution (0.2 milliequivalent/ml.) of poly-beta-methacrylyloxyethyltrimethylammonium methylsulfate. The water-insoluble product which precipitated consisted of a blend of the ion-crosslinked polyelectrolyte with the polychloroprene.

This product was washed well with water and then kneaded with glycerol. It was placed on a rubber mill while still wet and 0.27 g. of a poly-p-dinitrosobenzene rubber accelerator activator and 0.1 g. of a sodium dibutyl dithiocarbamate rubber accelerator were milled into this product. The polymeric mass was then divided into three portions.

One portion was pressed at room temperature to form a film 11 mils in thickness. After air-drying, this film was cured at 140° C. for 30 minutes to give a tough, elastic film which exhibited a leather permeability value of 3500. A second portion was pressed at room temperature onto parachute nylon fabric and, after air-drying, was cured at 140° C. for 30 minutes, giving a tough coating with good anchorage. A third portion was pressed onto a polyethylene terephthalate marquisette fabric and cured at 140° C. for 30 minutes. It also gave a tough coating having good anchorage to the fabric. In these three tests, the curing at elevated temperature produced covalent crosslinkages through the epoxy groups.

In some instances, additional desirable properties are imparted to the polymer blends of this invention by an aftertreatment with salts of polyvalent cations or of polyvalent anions, such as barium chloride, calcium chloride, magnesium chloride, tin tetrachloride, aluminum chloride, cadmium acetate, lead nitrate, mercuric chloride, zinc chloride, nickel diacetate, aluminum potassium sulfate, basic chromium sulfate, sodium silicate, sodium cobaltinitrite, sodium chloroplatinate and the like. Such a treatment reduces the tack of the wet compositions, gives stiffer products and serves to vary the texture of the films, e. g., to give them a rougher feel. The following example illustrates this aftertreatment.

*Example XVII*

A polymeric blend was prepared from the starting materials of Example VI and by the procedure of that example. Films were prepared from the polymeric blend and after air-drying, these films were pressed at 125° C. for 15 minutes. They were then tough and pliable but showed slight tackiness when wetted with water.

One of these films was immersed in a 5% aquous solution of aluminum potassium sulfate dodecahydrate for 5 minutes. After drying, this film was slightly less pliable but retained its toughness and was tack-free when wet. Another film was immersed in a 5% aqueous solution of sodium silicate for 5 minutes. After air-drying, this film was tack-free when wet. Its other properties were not affected except for a slight decrease in pliability. A third film was dipped first into 5% aluminum potassium sulfate dodecahydrate for 5 minutes, then in 5% sodium silicate for 5 minutes, with similar results.

Other aftertreatments can be applied to the polymer blends of this invention, including, for example, the already disclosed heat treatment of polyvinyl chloride blends, or the milling of curing agents into polychloroprene blends. Moreover, other materials such as fillers, plasticizers, pigments, dyes, etc. can be introduced in the blends.

The polymer blends of this invention can also be shaped into filamentary structures. This embodiment is illustrated in the following examples:

*Example XVIII*

To 10 ml. of the polyvinyl chloride latex of Example VI was added 15 ml. of an aqueous solution of sodium polyacrylate (0.55 milliequivalent/ml.) and 15 ml. of water. The mixture was stirred while 25 ml. of a 10% aqueous solution of poly-beta-methacrylyloxyethyldiethylmethylammonium methyl-sulfate was added. The plastic mass which separated was washed thoroughly with water. This mass was then extruded under pressure through an aperture 10 mil in diameter to form a long filament. After air-drying, the filament was immersed in a bath of glycerol maintained at 130–140° C. for 5 minutes. The resulting filament was clear, colorless and tough.

*Example XIX*

To 5 ml. of the cationic polychloroprene latex of Example IX was added 10 ml. of distilled water and 10 ml. of a 10% aqueous solution of poly-beta-methacrylyloxyethyldiethylmethylammonium methylsulfate. A portion of this mixture was ejected from a hypodermic springe through a number 25 hypodermic needle under the surface of a 2% aqueous solution of sodium alginate. The coagulum which formed at the tip of the needle was pulled away in the form of fibers. After drying at 60° C. these fibers were tough and somewhat elastic.

The starting materials suitable for the preparation of the polymeric blends of this invention include broadly any polyanionic and polycationic linear polymer, said polymer containing a plurality, at least seven, of ionic groups attached to the linear polymer chain. In general, these polymers have a molecular weight in excess of about 1000, in order to contain sufficient ionic groups for good crosslinking. These ionic polymers should have appreciable solubility in water, e. g., at least 1% and preferably at least 2%. Both addition polymers (e. g., vinylidene polymers) and condensation polymers can be used, the former being generally more accessible and therefore preferred.

Among the suitable polyanionic polymers can be mentioned the polymers of polymerizable aliphatic monocarboxylic acid having a methylene ($CH_2=$) group attached by an ethylenic double bond to a carbon atom alpha to the carboxylic acid group, e. g., polyacrylic acid, polymethacrylic acid, polyethacrylic acid, poly-alpha-chloroacrylic acid, etc.; the interpolymers of monocarboxylic acid of the acrylic series with polymerizable vinylidene compounds, for example, the copolymers of methacrylic acid with methyl methacrylate, vinyl acetate, styrene or 1,3-butadiene, or the copolymers of acrylic acid with acrylonitrile; the hydrolyzed copolymers of alpha, beta-ethylenically unsaturated dicarboxylic acid anhydrides such as maleic anhydride with polymerizable vinylidene compounds such as ethylene, propylene, isobutylene, styrene, methylvinyl ether, vinyl acetate, vinyl chloride, methyl acrylate, etc.; the polymeric acids obtained by reacting phosphoric acid with polymers containing 1,2-epoxy groups (application Ser. No. 218,885, filed by M. E. Cupery on April 2, 1951, now abandoned and of which U. S. Patent No. 2,723,971, dated November 15, 1955, is a continuation-in-part); the naturally occuring polymers, or derivatives thereof, containing a plurality of acidic groups, such as lignic acid, alginic acid, carboxymethylcellulose; and the like.

It is understood that the polyanionic polymers can be, and usually are, neutralized with a base such as ammonia, sodium hydroxide or potassium hydroxide prior to reacting with the polycationic polyelectrolyte, in order to increase their solubility in water. Thus, the polyanionic polymers are water-soluble linear acidic organic polymers containing attached to carbon atoms thereof a plurality of carboxyl (—COOH) or —OPO$_3$H$_2$ groups and water-soluble salts of these linear acidic organic polymers. A preferred class of these polyanionic polymers are the water-soluble salts of linear acidic organic polymers containing attached to carbon atoms thereof a plurality of carboxyl groups and also a plurality of 1,2-epoxy groups.

The preferred polyanions, from the standpoint of the properties of the final polymer blend, are the polymers of alpha,beta-ethylenically unsaturated monocarboxylic acids of three to four carbon atoms, e. g., acrylic and methacrylic acids.

The polycationic polyelectrolytes include any linear polymer or copolymer containing a plurality of tertiary amino groups attached to the linear polymer chain. Additional examples of suitable materials are poly-N-methylethylenimine; the polyvinylpyridines, the polyvinylquinolines; the polymerized acrylates and methacrylates of N-beta-hydroxyethyl tertiary amines such as beta-dimethylaminoethyl acrylate, beta-di-n-butylaminoethyl methacrylate, triethanolamine monomethacrylate, beta-dicyclohexylaminoethyl methacrylate, 1-(beta-methacrylyloxyethyl)piperidine, 4-(beta-methacrylyloxyethyl)-morpholine; the linear polyamides containing intralinear tertiary amino groups (U. S. Patent 2,274,831); the polymeric quaternary ammonium salts obtained by reacting polymers containing 1,2-epoxy groups with tertiary amines and water or acids (application Ser. No. 279,937, filed on April 1, 1952, by V. J. Webers, now U. S. Patent No. 2,676,166, dated April 20, 1954); and the like.

It is to be understood that the polycationic polymers can be, and preferably are, used in more water-soluble forms, e. g., as their salts with organic or inorganic acids, such as the acetate, hydrochloride or sulfate, or, in the case of polymers containing tertiary amino groups, as their quaternary ammonium salts, for example, with alkyl halides or dialkyl sulfates. Thus, the polycationic polymers are water-soluble linear organic polymers containing attached to carbon atoms thereof a plurality of tertiary amino groups, or quaternized amino groups and salts of these linear organic polymers containing tertiary amino groups.

The preferred polycations, from the standpoint of the properties of the final polymer blends, are the already mentioned polymerized acrylates and methacrylates of N-beta-hydroxyethyl tertiary amines and quaternary ammonium salts thereof, particularly polymers of a quaternized methacrylic acid ester of an N-beta-hydroxyethyl tertiary amine. The term "polymer of a quaternized methacrylic acid ester of an N-beta-hydroxyethyl tertiary amine" includes polymers of methacrylic acid esters of an N-beta-hydroxyethyl tertiary amine which are quaternized after polymerization as well as those wherein the methacrylic acid esters of an N-beta-hydroxyethyl tertiary amine are quaternized before polymerization. Such compounds are described, for example, in U. S. Patent 2,138,763.

As regards the third component of these polymer blends, viz., the nonelectrolyte polymer, there can be used any addition or condensation polymer which is insoluble in water but dispersible therein. For best results, it should have a molecular weight of at least 1000. Suitable types of nonelectrolyte polymers include the synthetic linear condensation polymers such as the polyamides, polyesters and polyesteramides, e. g., polyhexamethyleneadipamide, polyhexamethylenesebacamide, polydecamethyleneadipamide, polyethyleneterephthalate, the polyesteramides of U. S. Patent 2,312,879; and the water-insoluble addition polymers of monomeric ethylenically unsaturated organic compounds. This latter type is generally preferred. Of these, the most important are the polymers and copolymers of compounds having a terminal carbon-to-carbon double bond and the general formula

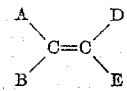

where A and B are hydrogen or halogen (fluorine, chlorine, bromine and iodine) and D and E are hydrogen, halogen, hydrocarbon radicals (e. g., alkyl, alkenyl, cycloalkyl, cycloalkenyl, aryl, aralkyl, aralkenyl), haloalkenyl, cyano, carbalkoxy (acyloxy, aldehyde, ketone, amido, imido, ether groups and the like. Still more preferred are the polymers and copolymers in which A and B in the above general formula are both hydrogen, i. e., the polymers and copolymers of ethylenic monomers having a terminal methylene group (vinyl and vinylidene monomers). Examples of suitable specific materials are the polymers and copolymers of vinyl halides (vinyl fluoride, chloride, bromide and iodide); vinylidene halides such as 1,1-difluoroethylene and 1,1-dichloroethylene; 1,1-dichloro-2,2-difluoroethylene, tetrafluoroethylene, trifluorochloroethylene; vinyl and vinylidene hydrocarbons such as ethylene, propylene, isobutylene, 1,3-butadiene isoprene, vinylcyclohexane, styrene, vinylnaphthalene, 2-phenyl-1,3-butadiene; halovinyl and halovinylidene hydrocarbons such as 2-fluoro-1,3-butadiene, 2-chloro-1,3-butadiene, 2,3-dichloro-1,3-butadiene, 2-iodo-1,3-butadiene; acrylyl and alkacrylyl compounds, e. g., acrylic, halocrylic and alkacrylic esters, nitriles and amides, for example, ethyl acrylate, methyl-methacrylate, butyl methacrylate, methoxymethyl methacrylate, chloroethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; unsaturated aldehydes and ketones, such as acrolein, methacrolein, methyl vinyl ketone; N-vinyl imides such as N-vinylphthalimide, N-vinylsuccinimide; unsaturated ethers such as vinyl ethyl ether, vinyl isobutyl ether, 2-phenoxy-1,3-butadiene; and other vinyl monomers such as N-vinylcaprolactam, N-vinylbutyrolactam, and the like, and copolymers of other unsaturates which, while not readily polymerizable per se, are capable of forming copolymers, such as dimethyl and diethyl fumarate, dimethyl and diethyl maleate, and the like.

For appreciable modification of the ion-crosslinked polymer, that is, for appreciable introduction of toughness and pliability at low humidity, it is desirable that the polymer blend contain at least 10% by weight of the nonelectrolyte polymer. The most useful blends are those containing between 50% and 90% by weight of the nonelectrolyte polymer.

The ionically crosslinked polymer blends of this invention are particularly useful in the form of self-supporting film suitable for packaging, and of supported film in the coating of porous materials such as textile fabrics. Their stability, hydrophilic nature and high degree of moisture permeability make them highly useful as hydrophilic fibers, substitutes for leather, and in many other fields. Fabrics coated or impregnated with these polymer blends show excellent antistatic properties. The polymer blends are also useful as impregnants for nonwoven webs of natural and synthetic fibers. Other uses for these polymer blends include leather finishes, food wrappings, water or humidity-sensitive instruments, semiconducting sheetings, electrical potting compounds, rain wear, fuel resistant gaskets or diaphragms, and the like. The polymer blends can also be shaped in the form of monofils or of fine fibers, which can be used to make fabrics or non-woven webs.

As many apparently widely different embodiments of this invention may be made without departing from the spirit and scope thereof, it is to be understood that this invention is not limited to the specific embodiments thereof except as defined in the appended claims.

I claim:

1. A water-insoluble homogeneous polymer blend of (I) a water-insoluble, water-dispersible, nonelectrolyte film-forming polymer from the class consisting of polymers of polymerizable ethylenically unsaturated monomers and synthetic linear condensation polymers from the class consisting of polyamides, polyesters and polyesteramides, and (II) the reaction product of (A) a water-soluble linear polymer from the class consisting of (a) linear acidic organic polymers containing attached to carbon atoms thereof a plurality of groups from the class consisting of —COOH and —OPO$_3$H$_2$ groups, and (b) salts of said linear acidic organic polymers, with (B) a water-soluble linear polymer from the class consisting of (a) linear organic polymers containing attached to carbon atoms thereof a plurality of groups from the class consisting of tertiary amino groups and quaternized amino groups and (b) salts of said linear organic polymers containing tertiary amino groups, said water-soluble polymers being united through ionic crosslinkages, and said water-insoluble, water-dispersible, nonelectrolyte film-forming polymer being at least 10% by weight of said blend.

2. A fabric coated with the water-insoluble homogeneous polymer blend of claim 1.

3. A woven fabric coated with the water-insoluble homogeneous polymer blend of claim 1.

4. A non-woven fabric coated with the water-insoluble homogeneous polymer blend of claim 1.

5. A water-insoluble homogeneous polymer blend of (I) a water-insoluble, water-dispersible, nonelectrolyte film-forming polymer of a polymerizable ethylenically unsaturated monomer, and (II) the reaction product of (A) a water-soluble salt of a linear acidic organic polymer containing attached to carbon atoms thereof a plurality of carboxyl groups with (B) a water-soluble linear organic polymer containing attached to carbon atoms thereof a plurality of quaternized amino groups, said water-soluble polymers being united through ionic crosslinkages, and said water-insoluble, water-dispersible nonelectrolyte film-forming polymer being at least 10% by weight of said blend.

6. A water-insoluble homogeneous polymer blend as set forth in claim 5 wherein said water-soluble, linear organic polymer (B) is a polymer of a quaternized methacrylic acid ester of an N-beta-hydroxyethyl tertiary amine.

7. A water-insoluble homogeneous polymer blend as set forth in claim 5 wherein said water-soluble salt of a linear acidic organic polymer (A) is a water-soluble salt of a polymer of an alpha-methylene aliphatic monocarboxylic acid of 3 to 4 carbon atoms.

8. A water-insoluble homogeneous polymer blend as set forth in claim 5 wherein said water-soluble salt of a linear acidic organic polymer (A) is sodium polyacrylate.

9. A water-insoluble homogeneous polymer blend as set forth in claim 5 wherein said water-insoluble, water-dispersible, nonelectrolyte film-forming polymer (I) is a polymer of a polymerizable ethylenically unsaturated monomer having a terminal methylene carbon, said water-soluble salt of a linear acidic organic polymer (A) is a water-soluble salt of a polymer of an alpha-methylene aliphatic monocarboxylic acid of 3 to 4 carbon atoms, and said water-soluble linear organic polymer (B) is a polymer of a quaternized methacrylic acid ester of an N-beta-hydroxyethyl tertiary amine.

10. A water-insoluble homogeneous polymer blend as set forth in claim 5 wherein said water-insoluble, water-dispersible, nonelectrolyte film-forming polymer (I) is polyvinyl chloride, said water-soluble salt of a linear acidic organic polymer (A) is sodium polyacrylate and said water-soluble linear organic polymer (B) is a polymer of a quaternized methacrylic acid ester of an N-beta-hydroxyethyl tertiary amine.

11. A water-insoluble homogeneous polymer blend as set forth in claim 5 wherein said water-insoluble, water-dispersible, nonelectrolyte film-forming polymer (I) is polychloroprene, said water-soluble salt of a linear acidic organic polymer (A) is sodium polyacrylate, and said water-soluble linear organic polymer (B) is a polymer of a quaternized methacrylic acid ester of an N-beta-hydroxyethyl tertiary amine.

12. A water-insoluble homogeneous polymer blend of (I) a water-insoluble, water-dispersible, nonelectrolyte film-forming polymer of a polymerizable ethylenically unsaturated monomer having a terminal methylene group, and (II) the reaction product of (A) a water-soluble salt of a linear acidic organic polymer containing attached to carbon atoms thereof a plurality of carboxyl groups and a plurality of 1,2-epoxy groups with (B) a water-soluble linear organic polymer containing attached to carbon atoms thereof a plurality of quaternized amino groups, said water-soluble polymers being united through ionic crosslinkages and being further united through covalent crosslinkages formed by reaction of said water-soluble polymers with said 1,2-epoxy groups, and said water-insoluble, water-dispersible, nonelectrolyte film-forming polymer being at least 10% by weight of said blend.

13. A water-insoluble homogeneous polymer blend as set forth in claim 12 wherein said water-soluble salt of a linear acidic organic polymer (A) is the partial reaction product of a water-soluble salt of a polymer of an alpha-methylene aliphatic monocarboxylic acid of 3 to 4 carbon atoms with epichlorohydrin.

14. A water-insoluble homogeneous polymer blend as set forth in claim 12 wherein said water-soluble salt of a linear acidic organic polymer (A) is the partial reaction product of sodium polyacrylate with epichlorohydrin.

15. A water-insoluble homogeneous polymer blend as set forth in claim 12 wherein said water-soluble linear organic polymer (B) is a polymer of a quaternized methacrylic acid ester of an N-beta-hydroxyethyl tertiary amine.

16. A water-insoluble homogeneous polymer blend as set forth in claim 12 wherein said water-insoluble, water-dispersible, nonelectrolyte film-forming polymer (I) is polychloroprene, said water-soluble salt of a linear acidic organic polymer (A) is the partial reaction product of sodium polyacrylate with epichlorohydrin, and said water-soluble linear organic polymer (B) is a polymer of a quaternized methacrylic acid ester of an N-beta-hydroxyethyl tertiary amine.

17. Process for preparing a water-insoluble homogeneous polymer blend which comprises mixing (I) an aqueous dispersion of electrostatically charged particles of a water-insoluble, water-dispersible, nonelectrolyte film-forming polymer from the class consisting of polymers of polymerizable ethylenically unsaturated monomers and synthetic linear condensation polymers from the class consisting of polyamides, polyesters and polyesteramides with (II) an aqueous solution of a water-soluble linear organic polymer containing attached to carbon atoms thereof a plurality of groups having in said aqueous solution the same charge as that of the electrostatically charged particles of said nonelectrolyte polymer, and then adding to the aqueous mixture (III) an aqueous solution of a water-soluble linear organic polymer containing attached to carbon atoms thereof a plurality of groups having in said aqueous solution the opposite charge from that of the electrostatically charged particles of said nonelectrolyte polymer, thereby ionically crosslinking said water-soluble linear organic polymers and coprecipitating said nonelectrolyte polymer therewith as a water-insoluble homogeneous polymer blend, one of said water-soluble linear organic polymers being from the class consisting of (a) linear acidic organic polymers containing attached to carbon atoms thereof a plurality of groups from the class consisting of —COOH and —OPO$_3$H$_2$ groups and (b) salts of said linear acidic organic polymers, and the other of said water-soluble linear organic polymers being from the class consisting of (a) linear organic polymers containing attached to carbon atoms thereof a plurality of groups from the class consisting of tertiary amino groups and quaternized amino groups and (b) salts of said linear organic polymers containing tertiary amino groups.

18. Process for preparing a water-insoluble homogeneous polymer blend which comprises mixing (I) an aqueous dispersion of electrostatically charged particles of a water-insoluble, water-dispersible, nonelectrolyte film-forming polymer of a polymerizable ethylenically unsaturated monomer having a terminal methylene group with (II) an aqueous solution of a water-soluble linear organic polymer containing attached to carbon atoms thereof a plurality of groups having in said aqueous solution the same charge as that of the electrostatically charged particles of said nonelectrolyte polymer, and then adding to the aqueous mixture (III) an aqueous solution of a water-soluble linear organic polymer containing attached to carbon atoms thereof a plurality of groups having in said aqueous solution the opposite charge from that of the electrostatically charged particles of said nonelectrolyte polymer, thereby ionically crosslinking said water-soluble linear organic polymers and coprecipitating said nonelectrolyte polymer therewith as a water-insoluble homogeneous polymer blend, one of said water-soluble linear organic polymers being a water-soluble salt of a linear acidic organic polymer containing attached to carbon atoms thereof a plurality of carboxyl groups, and the other of said water-soluble linear organic polymers containing attached to carbon atoms thereof a plurality of quaternized amino groups.

19. Process for preparing a water-insoluble homogeneous polymer blend as set forth in claim 18 wherein said water-soluble salt of a linear acidic organic polymer is a water-soluble salt of a polymer of an alpha-methylene aliphatic monocarboxylic acid of 3 to 4 carbon atoms.

20. Process for preparing a water-insoluble homogeneous polymer blend as set forth in claim 18 wherein said water-soluble salt of a linear acidic organic polymer is sodium polyacrylate and the other of said water-soluble linear polymers is a polymer of a quaternized methacrylic acid ester of an N-beta-hydroxyethyl tertiary amine.

21. Process for preparing a water-insoluble homogeneous polymer blend as set forth in claim 18 wherein said water-soluble salt of a linear acidic organic polymer contains attached to carbon atoms thereof a plurality of 1,2-epoxy groups in addition to said plurality of carboxyl groups and is the partial reaction product of sodium polyacrylate with epichlorohydrin, and the other of said water-soluble linear organic polymers is a polymer of a quaternized methacrylic acid ester of an N-beta-hydroxyethyl tertiary amine, and heating the resulting water-insoluble homogeneous polymer blend, thereby further uniting said ionically crosslinked polymers through covalent crosslinkages formed by reaction of said polymers with said 1,2-epoxy groups.

References Cited in the file of this patent

UNITED STATES PATENTS

| | | |
|---|---|---|
| 2,319,791 | Coes | May 25, 1943 |
| 2,503,209 | Nyquist et al. | Apr. 4, 1950 |
| 2,527,863 | Webb | Oct. 31, 1950 |
| 2,563,898 | Wilson et al. | Aug. 14, 1951 |
| 2,578,937 | Kunin et al. | Dec. 18, 1951 |
| 2,582,194 | Dudley | Jan. 8, 1952 |
| 2,607,750 | Wilson et al. | Aug. 19, 1952 |
| 2,625,529 | Hedrick et al. | Jan. 13, 1953 |

FOREIGN PATENTS

| | | |
|---|---|---|
| 586,759 | Great Britain | Mar. 31, 1947 |

OTHER REFERENCES

Fuoss et al.: Article in Science 110, pages 552–4, Nov. 25, 1949.